United States Patent Office 3,573,954
Patented Apr. 6, 1971

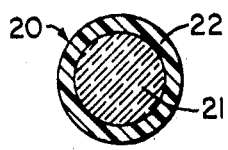
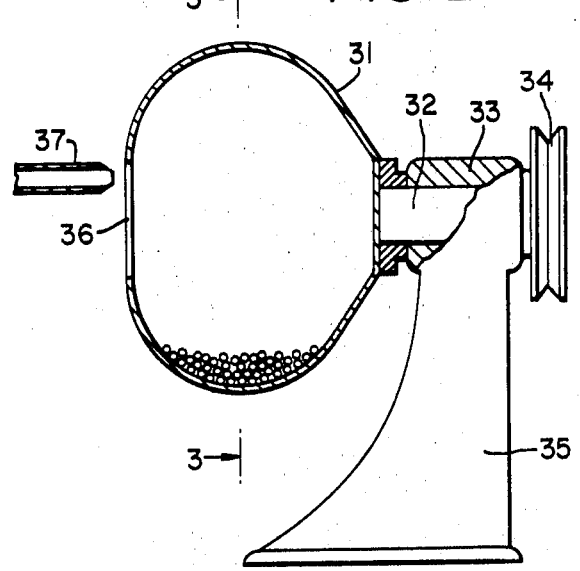
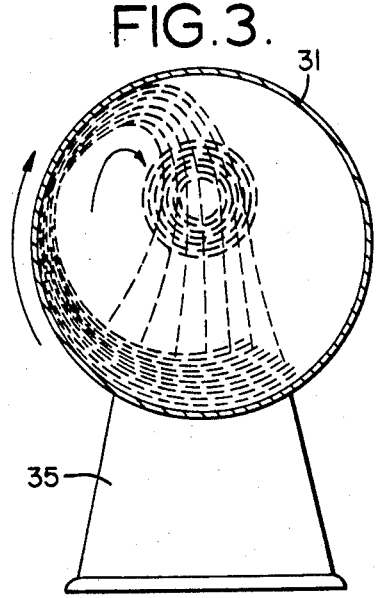
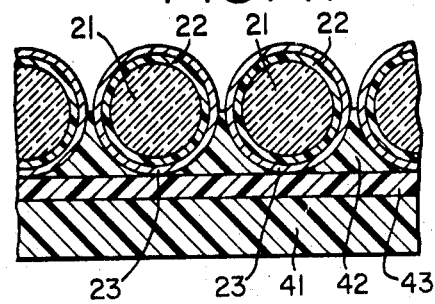
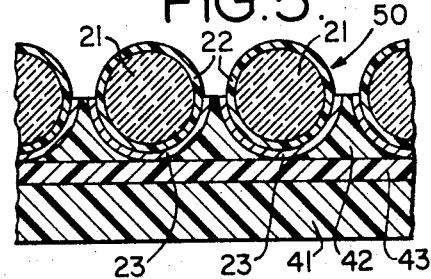

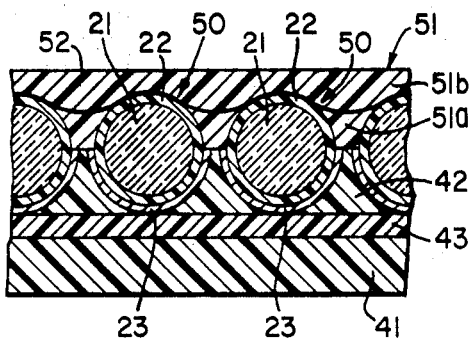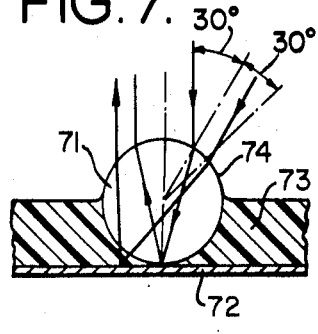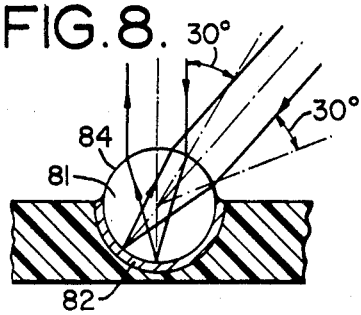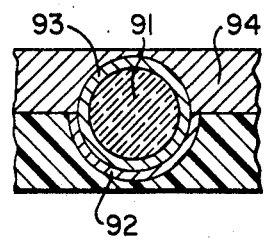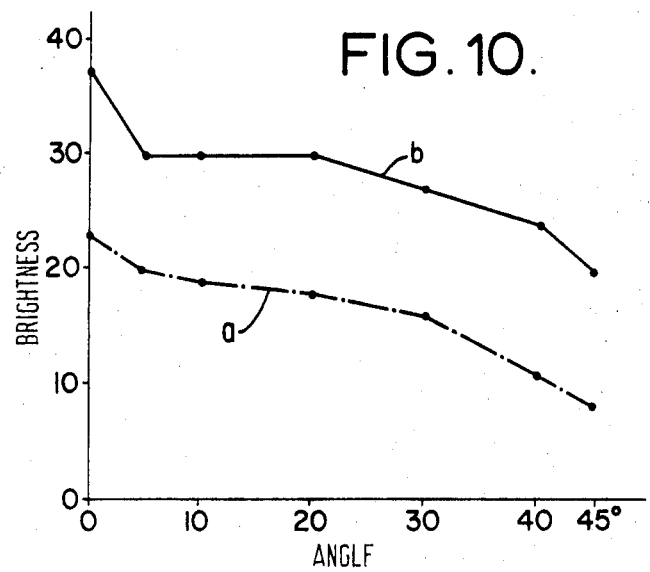

3,573,954
REFLEX-REFLECTORS AND METHOD FOR THE MANUFACTURE THEREOF
Tadashi Yamamoto, Kyoto, Japan, assignor of fractional part interest to Nihon Koken Co., Ltd., Ogawa Chiyokawa-cho, Kameoka, Kyoto, Japan
Filed July 1, 1968, Ser. No. 741,399
Claims priority, application Japan, July 5, 1967, 42/43,193; Oct. 18, 1967, 42/67,134
Int. Cl. B44c 1/08
U.S. Cl. 117—27
4 Claims

ABSTRACT OF THE DISCLOSURE

A method for the manufacture of microspherical lens elements for use in reflex-reflecting devices. Glass microspheres are tumbled in a rotating drum, sprayed with synthetic resin solution and cured to form the lens elements. The lens elements are next coated with reflective plating. The reflex-reflecting device is completed by preparing a substrate with a bonding layer, depositing the lens elements on the substrate, removing the reflective metal plating from the portion of the lens elements projecting from the substrate and finally coating the entire surface of the substrate and lens element assembly with a transparent synthetic resin to form a flat surface.

BACKGROUND OF THE INVENTION

This invention relates to improved reflex-reflectors, and particularly to improved reflex-reflecting devices utilizing microspherical lens elements consisting of a glass microsphere and a transparent shell adhered thereon, as well as methods for the manufacture of such reflex-reflecting devices like those.

Reflex-reflecting sheets having microspherical lens elements thereon are known and used for highway signs and marks. In a conventional type of reflex-reflecting sheet, transparent glass microspheres having a refractive index of 1.92 are deposited on a flat reflective layer and embeded at their respective hermispherical one-halves in a bonding agent layer which is also deposited on the reflective layer. The reflex-reflecting property of this type is only good with respect to the incident light flux perpendicular to the flat reflective layer and the incident angle-reflex-reflecting brightness characteristics is bad. In another conventional type, transparent glass microspheres having a refractive index of 1.92 as well are embeded at their respective semispherical one-halves in a bonding agent layer. The embedded back surface is plated with a reflective metal. This second type is advantageous that a good reflex-reflecting property is obtained irrespective of the incident angle of the light flux with respect to the sheet. This good reflex-reflecting property is, however, lost if the exposed front surfaces of the glass microspheres are overcoated by a transparent layer to protect the glass microspheres. An attempt has been made to overcome this difficulty by forming a transparent synthetic resin coating layer on the spherical surface each of the glass microspheres, thereby regulating the optical path so as to represent the optimum reflex-reflection as well as in the case without any overcoating layer. However, it has been found that if use of the glass microspheres having such a relatively low refractive index is continued, the thickness of the transparent synthetic resin coating layer must be such a great value as about 50% of the diameter of the glass microsphere. It is apparent that this will reduce the range of incident angle with respect to each of the lens elements which is practically useful. In addition absorption in such the thick synthetic resin coating layer like that results in lowering the reflex-reflecting effect. Another problem to be considered in connection with the lens elements having a transparent resin coating layer is the fact that it is extremely difficult to form an accurately concentric shell of a transparent synethic resin coating layer on the spherical surface of each of the glass microspheres having such a microscopic diameter as 50 to 100 microns. Uneven thickness of the shell also results in lowering the reflex-reflecting effect. On the other hand, in most of conventional devices the reflex-reflecting properties are substantially lost.

The primary object of the invention is, therefore, to provide an improved reflex-reflector and an improved method for the manufacture of the same in which the above mentioned disadvantages of conventional types can be avoided.

Another object of the invention is to provide an improved reflex-reflecting device which represents superior reflex-reflecting characteristics which have never been obtained hithertofore, irrespective of the incident angle of the incident light flux and whether it is rainy or not rainy.

A further object of the invention is to provide a method for the manufacture of reflex-reflecting devices having the above mentioned advantages which is carried out economically and with a good working property.

SUMMARY OF THE INVENTION

The method for the manufacture of a reflex-reflecting device according to the invention essentially comprises the steps in combination of preparing microspherical lens elements each comprising a transparent glass microsphere and a transparent synthetic resin coating layer adhered on the spherical surface thereof so as to form a concentric shell; depositing a reflective metal plating on the whole spherical surface of said shell of each of said lens elements; forming a bonding agent layer on a substratum; distributing and depositing said microspherical lens elements having a reflective metal plating on the spherical surface thereof onto said bonding agent layer in such a manner that substantially hemispherical one-half each of said lens elements is embedded in said bonding agent layer while the other-half remains exposed; subjecting said other one-half each of said lens elements exposed on the front surface of said bonding agent layer to a treatment for removing the exposed portion of said reflective metal plating from each of said lens elements; and overcoating the front surface of said bonding agent layer where the other half each of said lens elements is exposed with a transparent synthetic resin so as to form a surface layer having a flat, exposed front surface. The transpatent glass microsphere is made of a material having such a relatively high refractive index as within the range of 2.0 to 2.5 while the transparent shell has such a relatively low refractive index as within the range of 1.40 to 1.55. In a preferred embodiment, the transparent glass microsphere is made of a glass which essentially comprises $SiO_2$ and $PbO$ and the transparent shell is made of a synthetic resin such as methyl methacrylate and epoxy resin. The diameter of the transparent glass microsphere is within the range of 25 microns to 110 microns while the thickness of the transparent shell is about $\frac{1}{10}$ of the diameter of the transparent glass microsphere.

According to the invention the preparation of said microspherical lens elements is effected by spraying a synthetic resin solution toward glass microspheres which are falling down within a rotating drum, thereby forming a thin coating layer of synthetic resin on the spherical surface each of the glass microspheres, and curing the synthetic resin adhered on the surface of the glass microsphere. The thickness of the concentric synthetic resin shell formed by the above operation is within the range of 3 to 5 microns. If a thicker layer is required, the above operation is repeated.

The reflective metal plating is preferably formed by an electrolysis silver plating. The removal of the exposed portion of the reflective metal plating may be carried out by subjecting the portion to a treatment with an aqueous solution of nitric acid.

The transaparent synthetic resin for overcoating the front surface of said bonding agent layer with said exposed portions of the lens elements thereon is preferably the same material as the transparent synthetic resin forming the concentric shell of each of the lens elements. The steps of overcoating the front surface of said bonding agent layer with exposed portion of the lens elements comprises preferably at least two stages, the first stage overcoating substantially up to the level of the appex each of the exposed lens elements and then the second stage forming a flat exposed surface parallel to the substrate.

The transparent synthetic resin for overcoating the front surface of the bonding agent layer with the lens elements is preferably made of a synthetic resin having a good wettability.

The other features and advantages of the invention will become more apparent in the following description of the preferred embodiments of the invention with reference to the drawings.

Figure 1 is a section view of a lens element which is used in the present invention;

Figure 1a is a sectional view of a lens element on the spherical surface of which a reflective metal layer is formed;

Figure 2 is a schematic front view, partly in section, of an apparatus adapted for forming a coating layer on the spherical surface of each of the glass microspheres;

Figure 3 is a sectional view taken along the line of 3—3 of Figure 3;

Figures 4 to 6 are sectional views of a reflex-reflecting sheet schematically illustrating different stages of the process of the invention;

Figures 7, 8, 9, 12 and 13 are sectional views of various types of reflex-reflecting sheets for explanation of their respective reflex-reflecting effects; and Figures 10, 11 and 14 are graphs showing incident angle-reflex-reflective brightness characteristics in various conditions of various types of devices.

DESCRIPTION OF THE PREFERRED EMBODIMENT

Figure 11:
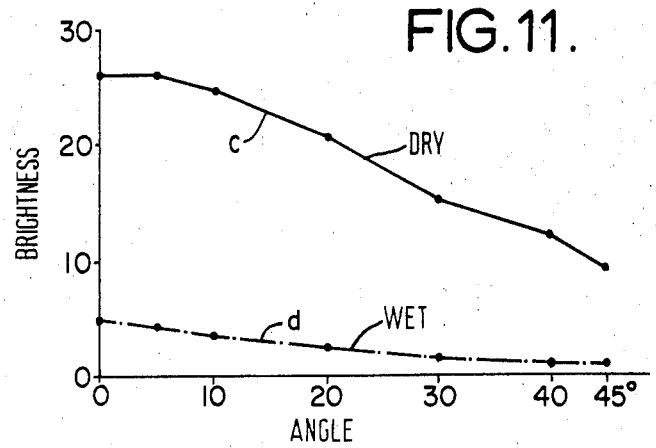

The first step of the method for manufacturing a reflex-reflecting device is to prepare microspherical lens elements each comprising a transparent glass microsphere and a transparnt synthetic resin coating layer adhered on the surface thereof. The microspherical lens element 20 shown in Figure 1 comprises a transparent central glass microsphere 21 and a transparent synthetic resin shell 22 concentrically covering said transparent central glass microsphere 21.

The central transparent glass microsphere must have a refractive index within the range of 2.0 to 2.5. Glass having such a high refractive index may comprise essentially $CiO_2$ and $PbO$. A preferred composition of the material for transparent glass microspheres is given by way of example as follows, all components being a percentages by weight to total 100.

| | Percent |
|---|---|
| $SiO_2$ | 53.0 |
| $Na_2O$ | 1.8 |
| $K_2O$ | 7.6 |
| $PbO$ | 25.8 |
| $Al_2O_3$ | 2.1 |
| Other impurities | 9.6 |
| Total | 100.0 |

The diameter of the central transparent microsphere is within the range of 25 microns to 110 microns. The diameter within the range of 25 microns to 37 microns is preferably useful for the case where the substratum of the reflex-reflecting device is yarn, the diameter within the range of 37 microns to 53 microns for the substratum of fabrics and the diameter within the range of 53 microns to 88 microns for the substratum of sheets or plates of metal or synthetic resin. Such glass microspheres as mentioned above commercially available, for example, as "Microbeads" from Fukuoka Tokusyu Co., Ltd. of Japan or "Ultra-Beads" or "U.B." from Tokyo Shibaura Denki Co., Ltd.

The transparent synthetic resin shell 22 is formed by coating the whole spherical surface of the transparent central glass microsphere 21 with a synthetic resin having a relatively low reflective index such as within the range of 1.40 to 1.55. Among the synthetic resins useful for this purpose there are mentioned methyl methacrylate having a refractive index about 1.45 and epoxy resin having a refractive index within the range of 1.50 to 1.53. The thickness of the resin layer 22 is about one tenth of the diameter of the glass microsphere but this depends on the refractive index ratio between the glass microsphere and the synthetic resin shell, namely, the refractive index of the glass microsphere 21 with respect to the synthetic resin shell 22. The transparent synthetic resin shell must be formed concentrically as exactly as possible. However, it has been hithertofore extremely difficult to obtain an accurately concentric resin coating layer on a glass microsphere. According to the invention, this can be achieved by utilizing a particular technique which is described in detail herein below.

FIGS. 2 and 3 illustrate an apparatus adapted for forming a concentric synthetic resin coating layer on the surface each of glass microspheres. Referring to FIGS. 2 and 3, a bulb-shaped drum 31 is fixed to a driven shaft 32 supported by a bearing 33 which is formed on the top end of a vertically extending stand 35. The shaft is horizontally supported and is provided at its extremity with a pulley 34 which is connected through a belt (not shown) to a prime mover (not shown). The drum 31 is provided at its one end opposite to the other end at which the shaft 32 is fixed, with an opening 36 toward which a nozzle 37 for spraying synthetic resin coating solution. Though not shown in the drawings, means may be provided for heating the drum.

The resin coating process with the above mentioned apparatus is carried out by way of example as follows:

A suitable amount of transparent glass microspheres having a refractive index of 2.3 and a diameter of $80\mu$ are inserted into the drum 31 through the opening 36. The drum is heated at a temperature within the range of 100 to 150° C., preferably, at approximately 120° C. and rotated at a speed within the range of 10 to 40 r.p.m., preferably within the range of 15 to 30 r.p.m. The glass microspheres in the drum 31 move along the inner peripheral wall from the bottom toward the top thereof and then fall down dispersedly, as shown by dash lines in FIG. 3. The position from which glass microspheres start to fall down, the width of the flow of glass microspheres and dispersion angle on their falling can be regulated by the shape and dimensions of the drum and/or by controlling the rotative speed of the drum.

A synthetic resin coating solution is conically sprayed from the nozzle 37 toward the glass microspheres which are falling down dispersedly. A preferred composition of the synthetic resin solution is given as follows, all proportions being in percentages by weight to total 100.

| | Parts in weight |
|---|---|
| Methyl methacrylate | 39 |
| Toluene | 69 |
| Stearic acid | 1 |

The above operation is continued until the coating grows to have an even thickness within the range of 3 to 5 microns. During this operation solvent is evaporated and the coating layer is semi-set. The spraying is then interrupted and the drum is heated up to a temperature of about 150° C. for curing the resin for about 5 to 10 minutes. In this manner, without the individual particles sticking together, a concentric resin shell having an even thickness is formed in a single stage on the spherical surface each of the glass microspheres.

A thicker coating can be obtained by subjecting glass microspheres having a first coating layer formed and cured to the same coating operation as mentioned above. A further repetition may be carried out. In this manner the glass microspheres can be coated with synthetic resin so as to form a transparent concentric shell having an even and desired thickness and a refractive index of 2.3.

According to the invention, the microspherical elements with a transparent resin shell are then subjected to a treatment for forming a reflective metal layer on the whole surface of the transparent resin shell. This process may be carried out by an electrolysis plating technique.

Before entering into an electrolysis plating, the microspherical lens elements are subjected to a cleaning process for removing impurities such as stearic acid. This may be carried out by treating the lens elements with methyl alcohol. 100 g. of methyl alcohol can dissolve 2 g. of stearic acid therein.

After cleaning, the lens elements are sensitized so that the surface thereof may receive an electrolysis metal deposion. In case of an electrolysis silver plating the sensitizing operation is, preferably, carried out by treating the lens elements with a sensitizing solution including stannous chloride. One of the typical compositions is as follows:

Stannous chloride—45 g.
Hydrochloric acid—40 cc.
Water—1000 cc.

The lens elements are immerged into the above sensitizing bath for 1 to 2 minutes at a temperature within the range of 18 to 20° C.

The sensitized lens elements are then immersed into an electrolysis metal plating solution. One of the typical electrolysis silver plating solutions consists of a mixture of the first aqueous solution including saccharose, nitric acid and alcohol with the second aqueous solution including silver nitrate, caustic soda and ammonia. The first solution may preferably prepared by adding 100 cc. of 8% ammonia water to a mixture of an aqueous solution of silver nitrate consisting of 4 g. of silver nitrate and 40 g. of distilled water with 20 cc. of a 20% aqueous solution of caustic soda. The second solution may preferably be prepared by mixing the following constituents:

Saccharose—45 g.
Concentrated nitric acid—2 cc.
Distilled water—500 cc.
96% alcohol—87 cc.

The lens elements with a synthetic resin layer are first immersed into the above second solution and then the above first solution is added to and mixed with the second solution, maintaining the temperature at 15 to 20° C. A reflective silver plating deposition is formed on the whole surface each of lens elements, taking about 5 minutes. The products are washed by water and then dried.

Any other methods may be utilized for forming the reflective metal plating. For example, a reflective aluminum plating can be obtained through the utilization of known aluminum vacuum evaporation technique. In such a case, an apparatus similar to that illustrated in FIG. 2 may be used within a vacuum system.

FIG. 1a illustrates a lens element having a reflective metal plating formed according to the above mentioned process. The reference numeral 23 indicates reflective metal deposition layer.

The lens elements having a reflective metal plating are then applied onto a substratum. FIG. 5 shows the state in which the lens elements having a reflective metal plating are applied onto a substratum 41.

The substratum 41 may be of any kind of material, for example, synthetic resin plates or films, iron plates and other metal plates, fabrics, paper sheets, other film or sheets, yarn and so forth. The substratum 41 may also be an adhesive layer which is pressure or heat sensitive. In a preferred embodiment, the substratum 41 may be of ABS resin which is a copolymer of acrylonitrile, butadiene and styrene.

On one surface of the substratum 41 is deposited a bonding agent layer 42 for carrying the lens elements having a reflective metal plating. If the bonding agent for forming the layer 42 does not have good affinity to the substratum 41, there may be used a primer between the substratum 41 and the bonding agent layer 42. The reference numeral 43 indicates such a primer layer. The primer used therebetween depends on both the material for the substratum 41 and the material for the bonding agent 42. The primer described should have a good affinity to both the materials and, in addition, be acid-resistant and solvent-resistant.

In a preferred embodiment of the invention, one surface of a substratum 41 made of ABS resin is coated with a primer which is commercially available as "Laquer Primer for ABS resin" in such an amount as to form a thin layer having a thickness of 10 to 20 microns when dried. The drying of the primer may be carried out at a room temperature or at a temperature within the range of 35 to 40° C for 10 minutes. The surface of the primer layer is then coated with MMA in such an amount that the resultant bonding agent layer 42, after being dried, may have a thickness within the range of 30 to 50 microns.

After the lapse of one minute, at room temperature, since MMA was applied on the hardened primer layer 43 to form bonding agent layer 42, the lens elements each having a reflective metal plating layer 23 are distributed and deposited on the whole surface of the bonding agent layer 42 in such a manner that substantially hemispherical one-half (preferably, 45 to 50%) each of the lens elements are embedded in the bonding agent layer while the other-half remains exposed, as shown in FIG. 4. This can be achieved by controlling the amount of the coating for the layer 42. It will be seen from FIG. 4, each of the lens elements with a reflective metal plating thereon comes into contact with the top surface of the hardened primer layer 43. In the case where no primer is used it will come into contact directly with the top surface of the substratum. Distribution of the lens elements is carried out evenly and so as to form a single layer. The density of distribution will be within the range of 1800 to 2000 particles or 150 to 300 g. per cm.$^2$, preferably 200 g per cm.$^2$. The bonding agent layer 42 carrying lens elements is then subjected to a heat soaking at a temperature within the range of 100 to 120° C. for about 5 minutes to be cured.

The sheet carrying lens elements at its top bonding agent layer is then subjected to a treatment for removing the exposed portion of the reflective metal plating from each of the lens elements. In the case of the silver plating, this treatmnt is carried out by subjecting at least the exposed portion of the reflective metal plating to a treatment with an aqueous solution of nitric acid. Usually, the whole sheet is immerged into an aqueous solution of nitric acid consisting of nitric acid and deionized water in a ration of 1:1 by weight. After the exposed portion of the silver plating is completely dissolved in the solution and removed from each of the lens elements, the sheet is subjected to a treatment with a weak alkaline solution to neutralize any nitric acid adhered to the sheet and then subjected to ultrasonic rinsing and subsequent drying.

After the above treatment, the hemispherical back surface having a reflective metal plating is embedded in the bonding agent layer 42 while other hemispherical front surface having no reflective metal plating is exposed, as shown in FIG. 5, whereby light is admitted in to the lens elements through each of the exposed transparent shells 22.

The final step of the method according to the invention is to overcoat the front surface of the bonding agent layer where the other half each of the lens elements is exposed with a transparent synthetic resin so as to form a surface layer having a flat, exposed front surface. The transparent synthetic resin for overcoating the front surface of the bonding agent layer as well as said exposed portions of the lens elements may be the same material as that for the transparent shell of each of the lens elements. In a preferred embodiment, MMA having a refractive index of 1.45 is used therefor.

The overcoating operation is preferably carried out in two stages. In the first stage the overcoating is effected substantially up to the level of the apex of the exposed portion of each of lens elements.

In FIG. 6, the reference numeral 51a indicates the first and lower overcoating layer formed in this first stage. After the first overcoating layer 51a has been cured, a further overcoating is carried out as the second state to form the exposed surface layer 51b having a flat front surface 52. Preferably, the lower overcoating layer 51a is made of the same material as that of the top overcoating layer 51b. The reference numeral 51 generally indicates the overcoating layer consisting of two layers 51a and 51b. If the layers 51a and 51b are made of the same material in the final product there will not exist any substantial boundary therebetween.

The overcoating layer 51 is preferably made of a weather-proof, transparent synthetic resin. It may also be colored. It is desired that the exposed front surface of the overcoating layer 51 have a good wettability to water.

The final product according to the invention is illustrated in FIG. 6 and comprises a substratum 41, a primer layer 43 adhered on the top surface of the substratum 41, a bonding agent layer 42 deposited on the primer layer 43, reflex-reflecting lens elements, generally indicated as 50, distributed and deposited on said bonding agent layer 42 so that substantially hemispherical one-half each of lens elements having a reflective metal plating 23 is embedded in said bonding agent layer 42 and a transparent synthetic resin layer 51 covering the exposed front surface of each of the lens elements as well as the front surface of the bonding agent layer 42, the front surface of the transparent synthetic resin layer being substantially flat and smooth.

The reflex-reflecting device manufactured according to the invention has good reflex-reflecting properties for better understanding of the properties of the reflex-reflecting device manufactured according to the invention. The theory of reflex-reflecting will be discussed in detail herein below referring to some comparative examples of known types.

FIG. 7 illustrates the most fundamental reflex-reflecting device of known type in which transparent glass microspheres 71 are deposited on a flat reflective layer 72 which is coated by a transparent synthetic resin layer 73 so as to embed substantially hemispherical back surface each of the glass microspheres 71 therein. It is known that if the refractive index of the glass microsphere 71 is approximately 1.92, the light which enters into the glass microsphere 71 in the direction perpendicular to the reflective plane 72 and with an incident angle of approximately 30° with respect of the spherical surface 74 of the glass microsphere 71 is substantially completely reflex-reflected as shown in FIG. 7. This is the optimum condition and the brightest reflex-reflection of the incident light flux in the direction perpendicular to the reflective plane can be obtained with the glass microsphere having the above mentioned refractive index of 1.92. However, this can not be applied to any incident light flux which is not perpendicular to the reflective plane. It will be understood from the FIG. 7 that if the incident light is not perpendicular to the reflective plane 72, the light which is entered into the glass microsphere 71 with an incident angle of approxi mately 30° with respect to the spherical surface 74 of the glass microsphere is not completely reflex-reflected. It may therefore be said that in the example shown in FIG. 7 the angle-brightness characteristics are bad.

FIG. 8 is another example of known type in which the transparent glass microsphere 81 has a reflective metal plating 82 on the embedded back surface. In this case, any incident light entering into the glass microsphere with an incident angle of 30° with respect to the spherical surface 84 is completely reflex-reflected and the optimum condition is obtained with the glass microsphere having a refractive index of 1.92 irrespective of the direction of the incident light. It will, therefore, be understood that good angle-brightness characteristics can be obtained with this type. The similar angle-brightness characteristics will be obtained by having the layer supporting the glass microspheres including with refractive pigment instead of providing the glass microsphere at its embedded back surface with a reflective metal plating. But the latter will suffer from a bad brightness since the reflective power on the embedded surface of the glass microsphere is not so good.

An attempt has been made to overcoat the exposed front surface of such a reflex-reflecting sheet as shown in FIG. 8 with a transparent synthetic resin layer. In that case in order to obtain the same optimum reflex-reflecting condition as mentioned above, means are provided for adjusting the incident light having an incident angle of 30° with respect to the spherical surface of the glass microsphere so as to be completely reflex-reflected. This can be achieved by forming a transparent synthetic resin coating layer 93 on the spherical surface of the glass microsphere. This is illustrated in FIG. 9 in which the reference numeral 91 indicates the glass microsphere, 92 the reflective metal layer on the embedded back surface of the transparent synthetic resin coating layers 93 and 94 the transparent overcoating layer. Assuming that both the transparent synthetic resin coating layer 93 and the overcoating layer 94 are made of the same material having a refrax index of 1.45, if the refrax index of the glass microsphere is 1.92, the thickness of the transparent synthetic resin layer 93 required for obtaining the above mentioned optimum condition varies according to the diameter of the glass microsphere as follows:

| Glass microsphere | | Transparent shell | |
| --- | --- | --- | --- |
| Diameter, micron | Refrax index | Refrax index | Thickness, micron |
| 100 | 1.92 | 1.45 | 43.0 |
| 80 | 1.92 | 1.45 | 34.4 |
| 70 | 1.92 | 1.45 | 30.1 |
| 60 | 1.92 | 1.45 | 25.8 |
| 50 | 1.92 | 1.45 | 21.5 |

In each of the above cases, the refrax index ratio between the glass microsphere and the transparent shell, namely, the refrax index of the former with respect to the latter is about 1.324. It will be seen from the above that a relatively great thickness is required for the transparent shell. This disadvantage can be avoided by using a material having a larger refrax index such as within the range of 2.0 to 2.5 for the glass microsphere. If the refrax index of the glass microsphere is 2.3, the thickness of the transparent shell required for obtaining the optimum condition is given as follows:

| Glass microsphere | | Transparent shell | |
| --- | --- | --- | --- |
| Diameter, micron | Refrax index | Refrax index | Thickness, micron |
| 100 | 2.3 | 14.5 | 13.0 |
| 80 | 2.3 | 14.5 | 10.4 |
| 70 | 2.3 | 14.5 | 9.1 |
| 60 | 2.3 | 14.5 | 7.8 |
| 50 | 2.3 | 14.5 | 6.5 |

In the above cases, the refrax index ratio between the glass microsphere and the transparent shell is about 1.517. It will be seen from the above that the thickness of the transparent shell required for obtaining the optimum condition can be remarkably reduced with use of the glass microsphere having a higher refrax index. According to the invention, therefore, the refrax index of the glass microsphere is selected within the range of 2.0 to 2.5. In this connection it should be noted that the refrax index of the transparent synthetic resin coating layer forming the peripheral shell of the glass microsphere must be relatively small such as within the range of 1.40 to 1.50. In the above cases, the thickness of the transparent shell is about 13% of the diameter of the glass microsphere. In connection with the above it should be noted that the optimum condition can be obtained when the light entering into the lense element with an incident angle within the range of 20°–35°, preferably of approximately 30° with respect to the spherical surface of the lens element is completely reflex-reflected. In the product according to the method of the invention, the refractive property of the lens system consisting of the central glass microsphere, the transparent shell and the overcoating layer should provide the above mentioned optimum condition.

It is desired that in the example shown in FIG. 9 concentrically is achieved with high accuracy. It is, however, extremely difficult to form on a glass microsphere having such a small diameter as within the range of 25 to 110 microns a transparent coating layer having an even thickness. It has been found that in commercially available reflex-reflecting sheets utilizing microspherical lens elements comprising a central glass microsphere with a transparent synthetic resin shell, the transparent synethetic resin shell is not so accurately concentrically formed. Deformation or excentricity of the transparent synthetic resin causes a reduction in brightness. In FIG. 10, the lines $a$ and $b$ indicate the incident angle-brightness characteristics of a commercially available reflex-reflecting sheet and a reflex-reflecting sheet manufactured according to the invention, respectively. In FIG. 10, the axis of abscissa indicates the incident angle with respect to the reflex-reflecting sheet and the ordinate indicates the reflex-reflecting brightness the unit of which is such that the brightness of MgO is 1. The reflex-reflecting sheet manufactured according to the invention utilizes lens elements comprising a glass microsphere having a refrax index of 2.3 and a transparent MMA resin shell, and a transparent resin layer overcoating the front surface of the sheet. MMA used as the material for both the transparent shell and the overcoating layer has a refrax index of 1.45. It has been found that the commercially available sheet utilizes microspheric lens elements comprising a central transparent glass microsphere having a refrax index of 2.25 and a transparent synthetic resin coating shell having a refrax index of 1.42. In comparison of these two lines illustrated in FIG. 10, it will be seen that the reflex-reflecting sheet manufactured according to the invention is superior in the brightness. This is believed due to the fact that in the reflex-reflecting sheet manufactured according to the invention, the transparent shell is formed concentrically with high accuracy while in the commercially available one the transparent shell is not so accurately concentrically formed.

Figure 12:
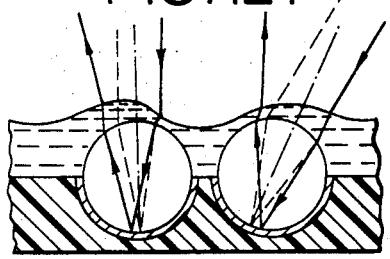

Another problem to be considered is any change in brightness which might occur when the front surface of the reflex-reflecting device is wetted with water, as in a rainy day. For comparison purpose I have tested a reflex-reflecting sheet which is commercially available and has the construction as illustrated in FIG. 8 where there is no overcoating layer used. In the sample sheet the refrax index of the glass microspheres was 1.9. In FIG. 11, two lines $c$ and $d$ indicate the dry and wet conditions, of this sample, respectively. It will be understood that if the front surface of the sheet is wetted, the reflex-reflecting brightness is remarkably reduced. It is believed that this is due to the fact that water layer is deposited in such a deformed form as illustrated in FIG. 12 where the thickness of the water layer is not even and the exposed surface of the water layer is not flat but of an irregular wave form.

Figure 13:
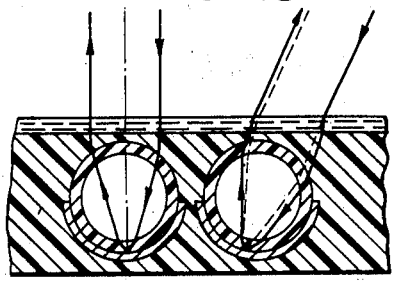
Figure 14:
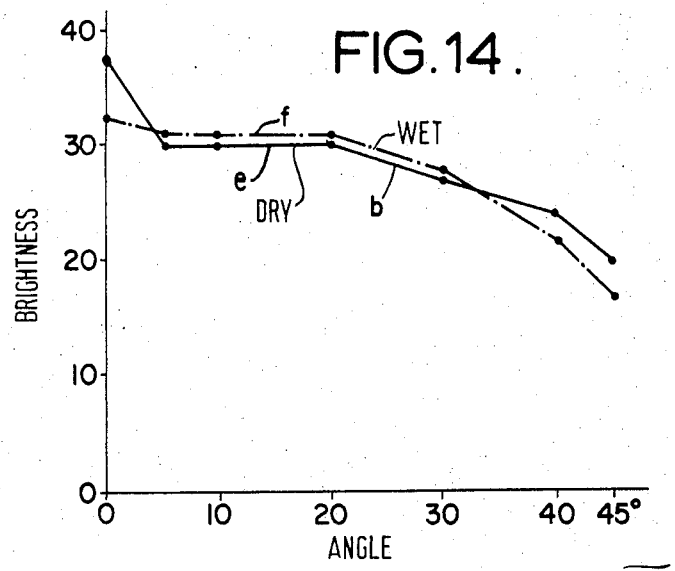

To the contrary, the reflex-reflecting sheet according to the invention is provided with an overcoating layer the exposed front surface of which is flat. Accordingly when it is wetted with water, the water layer is formed on the exposed surface of the overcoating layer so as to have substantially even thickness as shown in FIG. 13. FIG. 14 shows the incident angle-brightness characteristics in two different conditions of the reflex-reflecting device of the invention, one being dried and the other being wetted. The sample used is the same as described referring to FIG. 10. The two curves $e$ and $f$ are for the dry condition and for wetted condition, respectively. The curve $e$ is identical with the curve $a$ $b$ of FIG. 10. It will be seen from FIG. 14 there occurs no substantial change in brightness with the wetting.

According to the invention a good brightness characteristic can thus be obtained as well as a good angle characteristic whether it is in a dry condition or wet condition.

What I claim is:

1. In the method for manufacturing a reflex reflecting device having the steps of preparing microspherical lens elements formed of a transparent glass microsphere and a synthetic resin coating; depositing a reflective metal plating on the entire surface of the lens elements; preparing a substrate with a bonding layer thereon; depositing the reflective metal surfaced lens elements in the bonding layer with a portion of each of the lens elements projcting upwardly from said bonding layer; removing the reflective metal plating from the portion of the lens elements projecting upwardly from the bonding layer; the improvement comprising the further step of preparing the microspherical lens elements, prior to the coating thereof with metal, by tumbling, in a rotating drum, transparent glass microspheres having diameters within the range of 25 microns to 110 microns; spraying a synthetic resin solution toward said glass microspheres as they are tumbled; curing the synthetic resin which adheres to the surface of the glass microspheres to form a thin layer of synthetic resin on the surface of each of said glass microspheres, said thin layer of synthetic resin having a uniform and even thickness within the range of 3 microns to 5 microns; repeating the synthetic resin thin layer forming steps of tumbling said lens elements in a rotating drum, spraying a synthetic resin solution toward the elements being tumbled in the rotating drum and curing the synthetic resin which adheres to the surface of the lens elements until the lens elements comprised of a transparent glass microsphere having a uniform, even and desired thickness of the layer of synthetic resin on the surface thereof are obtained, said desired thickness of the layer of synthetic resin providing desired lens characteristics.

2. A method for the manufacture of reflex-reflecting devices as in claim1 wherein the synthetic resin coating is methyl methacrylate having a refractive index of about 1.45.

3. A method of the manufacture of reflex reflecting devices as in claim 1, in which said synthetic resin solution essentially comprises methyl methacrylate and a solvent therefor.

4. A method of the manufacture of reflex reflecting devices as in claim 1, wherein the transparent glass microspheres and the transparent glass microspheres having a thin layer of synthetic resin are tumbled in a rotating drum which is heated at a temperature within the range of 100 to 150° C., and the curing of the synthetic resin is carried out at a temperature of about 150° C. and for 5 to 10 minutes.

References Cited
UNITED STATES PATENTS

| | | | |
|---|---|---|---|
| 2,407,680 | 9/1946 | Palmquist et al. | 350—105 |
| 2,713,286 | 7/1955 | Taylor | 350—105 |
| 3,025,764 | 3/1962 | McKenzie | 350—105 |
| 3,286,604 | 11/1966 | de Vries | 350—105 |
| 3,420,597 | 1/1969 | Nellessen et al. | 350—105 |
| 3,101,040 | 8/1963 | Lanz | 117—100.0 X |
| 3,141,792 | 7/1964 | Lachman et al. | 117—109 X |

DAVID SCHONBERG, Primary Examiner

M. J. TOKAR, Assistant Examiner

U.S. Cl. X.R.

117—33, 100, 109; 350—107, 320